US012145162B2

United States Patent

(12) United States Patent
Afshar et al.

(10) Patent No.: US 12,145,162 B2
(45) Date of Patent: Nov. 19, 2024

(54) PRESSURE REGULATOR WITH CHECK VALVE FOR SPRINKLERS

(71) Applicants: Reza Afshar, Newbury Park, CA (US); Kevin Miller, Stevenson Ranch, CA (US)

(72) Inventors: Reza Afshar, Newbury Park, CA (US); Kevin Miller, Stevenson Ranch, CA (US)

(73) Assignee: Praxxis, LLC, Valencia, CA (US)

( * ) Notice: Subject to any disclaimer, the term of this patent is extended or adjusted under 35 U.S.C. 154(b) by 969 days.

(21) Appl. No.: 17/152,654

(22) Filed: Jan. 19, 2021

(65) Prior Publication Data

US 2022/0226851 A1 Jul. 21, 2022

(51) Int. Cl.
*B05B 12/08* (2006.01)
*B05B 15/74* (2018.01)

(52) U.S. Cl.
CPC ............ *B05B 12/087* (2013.01); *B05B 15/74* (2018.02)

(58) Field of Classification Search
CPC ....... B05B 12/087; B05B 15/70; B05B 15/72; B05B 15/74; F16K 15/025; F16K 15/026; F16K 15/028; F16K 15/06; F16K 15/063; F16K 15/067
See application file for complete search history.

(56) References Cited

U.S. PATENT DOCUMENTS

| | | | | |
|---|---|---|---|---|
| 4,913,352 A * | 4/1990 | Witty | B05B 15/74 239/570 |
| 5,779,148 A | 7/1998 | Saarem | |
| 6,186,413 B1 * | 2/2001 | Lawson | B05B 15/74 239/206 |
| 6,997,393 B1 * | 2/2006 | Angold | B05B 15/74 239/203 |
| 8,408,482 B2 | 4/2013 | Gregory | |
| 8,794,542 B1 * | 8/2014 | Hunter | B05B 15/74 239/239 |
| 8,991,730 B2 | 3/2015 | Kah, III | |
| 8,998,107 B2 | 4/2015 | Sesser | |
| 9,699,974 B2 | 7/2017 | Clark | |
| 11,103,890 B1 * | 8/2021 | Morris | B05B 12/087 |
| 2007/0235559 A1 * | 10/2007 | Miyake | F16K 1/12 239/203 |

(Continued)

*Primary Examiner* — Darren W Gorman
(74) *Attorney, Agent, or Firm* — Louis F. Teran

(57) ABSTRACT

A water pressure regulator with check valve for sprinklers comprising a housing, a shaft assembly, a spring, and a skirt element. The pressure regulator is a separate unit that can be inserted into the stem or movable riser of a typical pop-up sprinkler or other sprinklers. As the irrigation water passes through the pressure regulator of the present invention, the water pressure displaces the shaft assembly upward relative to the housing. The higher the shaft assembly is displaced, the smaller the cross-sectional area through which water passes within the housing or skirt element. The variation in the size of the cross-sectional area allows the present invention to regulate the out flowing water pressure of the irrigation water. When the flow of irrigation water stops, the spring pushes the shaft assembly downward so as to seal the hole through which water flows thus serving as a check valve. The separate unit design allows the pressure regulator of the present invention to be retrofittable into a common pop-up sprinkler.

28 Claims, 12 Drawing Sheets

(56) References Cited

U.S. PATENT DOCUMENTS

| | | | | |
|---|---|---|---|---|
| 2012/0118405 A1* | 5/2012 | Kah, Jr. | .................. | B05B 15/40<br>137/505 |
| 2019/0143361 A1 | 5/2019 | Kah, Jr. | | |
| 2020/0346237 A1* | 11/2020 | Luo | ......................... | B05B 15/65 |
| 2021/0046498 A1* | 2/2021 | Kah, III | .................. | B05B 15/65 |
| 2022/0023903 A1* | 1/2022 | Malcolm | ................. | F16K 17/06 |

* cited by examiner

PRESSURE REGULATOR WITH CHECK VALVE FOR SPRINKLERS

BACKGROUND OF THE INVENTION

Field of the Invention

The present invention relates generally to the field of pressure regulators for sprinklers. More specifically, the present invention relates to a pressure regulator with check valve that can be inserted into the stem or movable riser of a pop-up type sprinkler.

Description of Prior Art

A common type of sprinkler used to irrigate lawns, trees, and flowers, is known as a pop-up sprinkler. Pop-up sprinklers are typically buried in the ground such that the top is flush with the ground. The flow of water then allows a riser to extend or pop-up upward from the ground to irrigate or distribute water from a higher level than the ground so as to cover a greater area. Generally, a pop-up sprinkler has a housing, a riser, and a spring. The riser is in the housing and is movable between an extended position in which the riser extends from the housing and a retracted position in which the riser is retracted from the extended position. The spring is placed so that it pushes the riser toward the retracted position. When the irrigation water is turned on, the water pressure forces the riser to the extended position against the biasing action of the spring and the water is distributed or sprayed from the riser.

An irrigation system typically comprises of many pop-up sprinklers. Generally each pop-up sprinkler receives water at different pressures. Some sprinklers may be nearer to the source of the water and/or may be at a different elevation that other sprinklers. Thus, not each sprinkler irrigates with the same water pressure. In addition, various states and municipalities are enacting restrictions or limits on the water pressure from each sprinkler. To address these problems, certain pop-up sprinklers include a pressure regulator within its riser.

A pressure regulator that is operated by differential fluid pressures may require an aperture in the riser to act as a vent for the pressure regulator. It is known to provide first and second axially spaced seals carried by the housing and cooperate with the riser to seal around the riser. With this conventional construction, the first and inner seal is fluid tight and the second seal is a dust seal which allows the passage of air. In the retracted position, the aperture is protected from particulates by these two seals. However in an extended position, the aperture s above both of these seals and is therefore exposed outside of the housing where it may become clogged, in which event the pressure regulator cannot function as intended.

A typical pressure regulator for a pop-up sprinkler may include a valve seat mounted within the riser and a valve tube movable within the riser and a valve tube movable within the riser and cooperable with the valve seat to provide pressure regulation. It is important to seal the interface between the movable valve tube and the inner wall of the riser, and it is known to attempt to accomplish this function with an O-ring. Unfortunately, an O-ring is not as tolerant as desired to debris and also may impose significant friction which inhibits movement of the valve tube.

Even more, prior attempts to teach a pop-up sprinkler with a pressure regulator in the riser have proven to be expensive, ineffective, or not marketable. U.S. Pat. No. 5,779,148 teaches a pop-up sprinkler with a pressure regulator. However, the pressure regulator includes multiple part that make it costly or ineffective. Even more, this pressure regulator keeps the riser tube in the open position so that water can backflow. Furthermore, U.S. Pat. No. 8,998,107, teaches a pop-up sprinkler with the pressure regulator built in. The pressure regulator is permanent and built into the sprinkler. In addition, the complexity and amount of parts in the pressure regulator make this device ineffective and costly. Finally, U.S. Pat. No. 8,408,482, teaches a sprinkler with a pressure regulator built in.

However, none of the above teach a pressure regulator that is not built into a pop-up sprinkler but can be inserted into the riser of a typical pop-up sprinkler. As such what is needed is a pressure regulator that can be inserted into a conventional pop-up sprinkler so as to retrofit the sprinkler to include a pressure regulator that can be adjusted to specific circumstances. Even more, there is no pressure regulator that can be inserted into a conventional pop-up sprinkler and includes a check valve to prevent the backflow of water or the leaking of water at low pressures. The pressure regulator with check valve for sprinklers of the present invention provides a practical and satisfactory device which is a significant advance in the art that meets the needs of the market.

BRIEF SUMMARY OF THE INVENTION

Accordingly, the present invention has been made in view of the above-mentioned disadvantages occurring in the prior art, and it is the object of the present invention to provide a pressure regulator with check valve for sprinklers.

It is another object of the present invention to provide a pressure regulator that can be inserted into the riser tube of a conventional pop-up sprinkler.

It is yet another object of the present invention to provide a pressure regulator that also serves as a check Valve to prevent backflow of water within the sprinkler and the leaking of water at low pressure.

It is yet another object of the present invention to provide a pressure regulator that controls the flow rate of the water being used to irrigate.

It is yet another object of the present invention to provide a pressure regulator that can be adjusted to at least two (2) pressure settings.

It is yet another object of the present invention to provide a pressure regulator with check valve for sprinklers that is inexpensive to manufacture.

To accomplish the above objects, the present invention is embodied in a pressure regulator with check valve for sprinklers comprising a housing, a shaft assembly with a seal plate, a spring, and a skirt element. The pressure regulator with check valve for sprinklers of the present invention is inserted into the riser tube of a conventional pop-up sprinkler through its bottom opening. The spring is placed such that it pushes the seal plate downward to seal or block any water from entering the riser tube at low pressure or back-flowing from the riser tube. When water with sufficient pressure is introduced into the riser tube, the water pressure pushes against the spring and displaces the seal plate to allow water to flow into the riser tube at a predetermined pressure and flow rate. Then the water exits out of the riser tube through the top to irrigate a lawn, tree, or flowers.

The above and other features and advantages of the present invention, as well as the structure and usage of various embodiments of the present invention, are described in detail below with reference to the accompanying drawings.

DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functional similar elements. A more complete appreciation of the invention and many of the attendant advantages thereof will be readily obtained as the same becomes better understood by reference to the following detailed description considered in connection with the accompanying drawings, wherein.

DETAILED DESCRIPTION OF THE INVENTION

Figure 1:
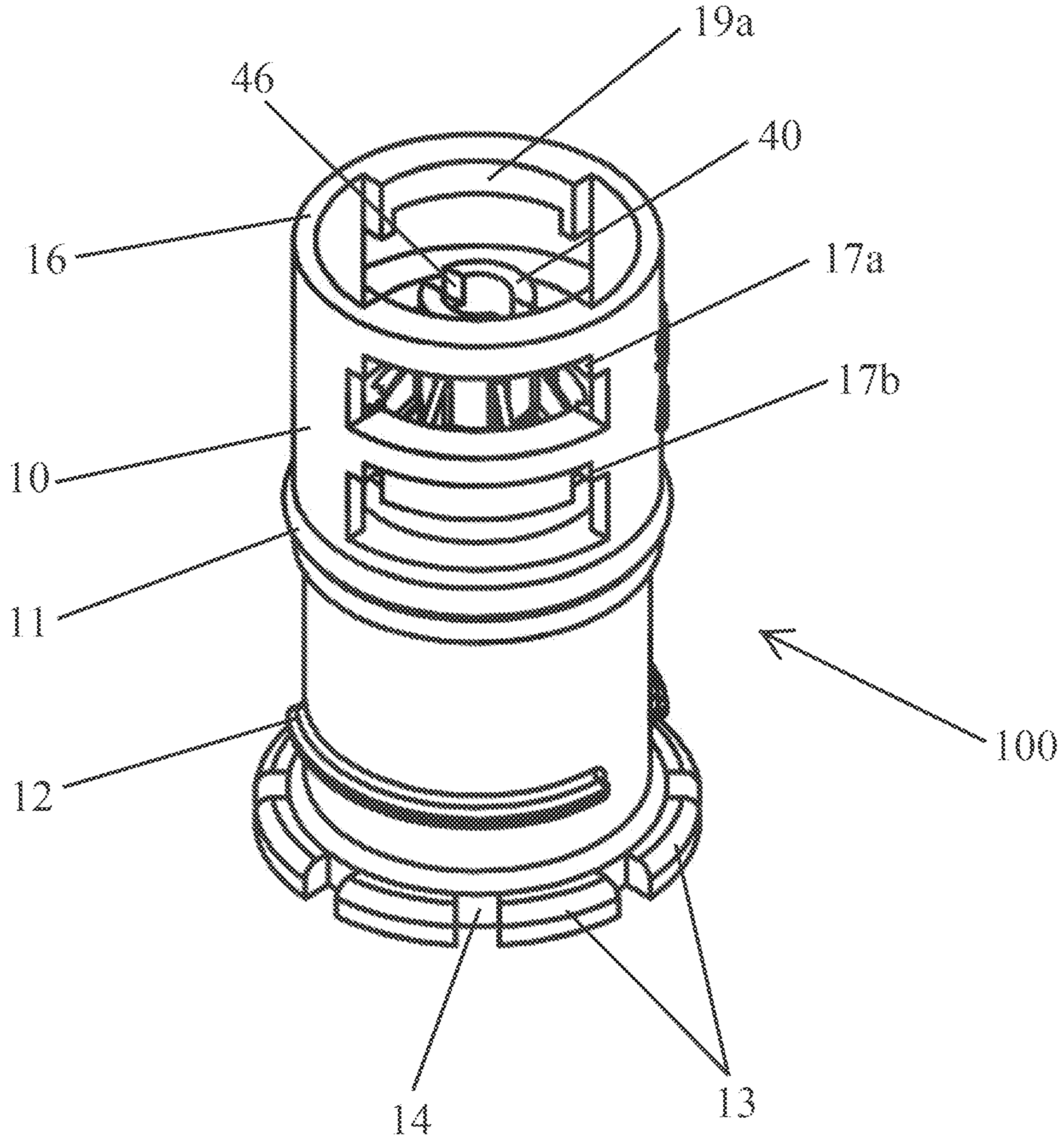
FIG. 1 shows a perspective view of the pressure regulator with check valve for sprinklers according to the present invention as it is used to irrigate lawns, trees, or flowers.

Certain terminology is used in the following descriptions for convenience only and is not limiting. The words “right”, “left”, “lower”, and “upper” designate directions in the drawings to which reference is made. The words “inwardly” or “distally” and “outwardly” or “proximally” refer to directions toward and away from, respectively, the geometric center or orientation of the device and instruments and related parts thereof. The terminology includes the above-listed words, derivatives thereof, and words of similar import.

Although the present invention can be used in connection with any type of sprinkler or irrigation application, it is especially suited for pop-up sprinklers in connection with the irrigation of lawns, trees, and flowers. Accordingly, the present invention will be described herein with reference to pop-up sprinkler applications. However, the preferred system of the present application may also be adapted for with other types of sprinklers or irrigation systems.

Reference will be made to the drawings in which various elements of the present invention will be given numerical designations and in which the invention will be discussed so as to enable one skilled in the art to make and use the present invention.

Figure 10:
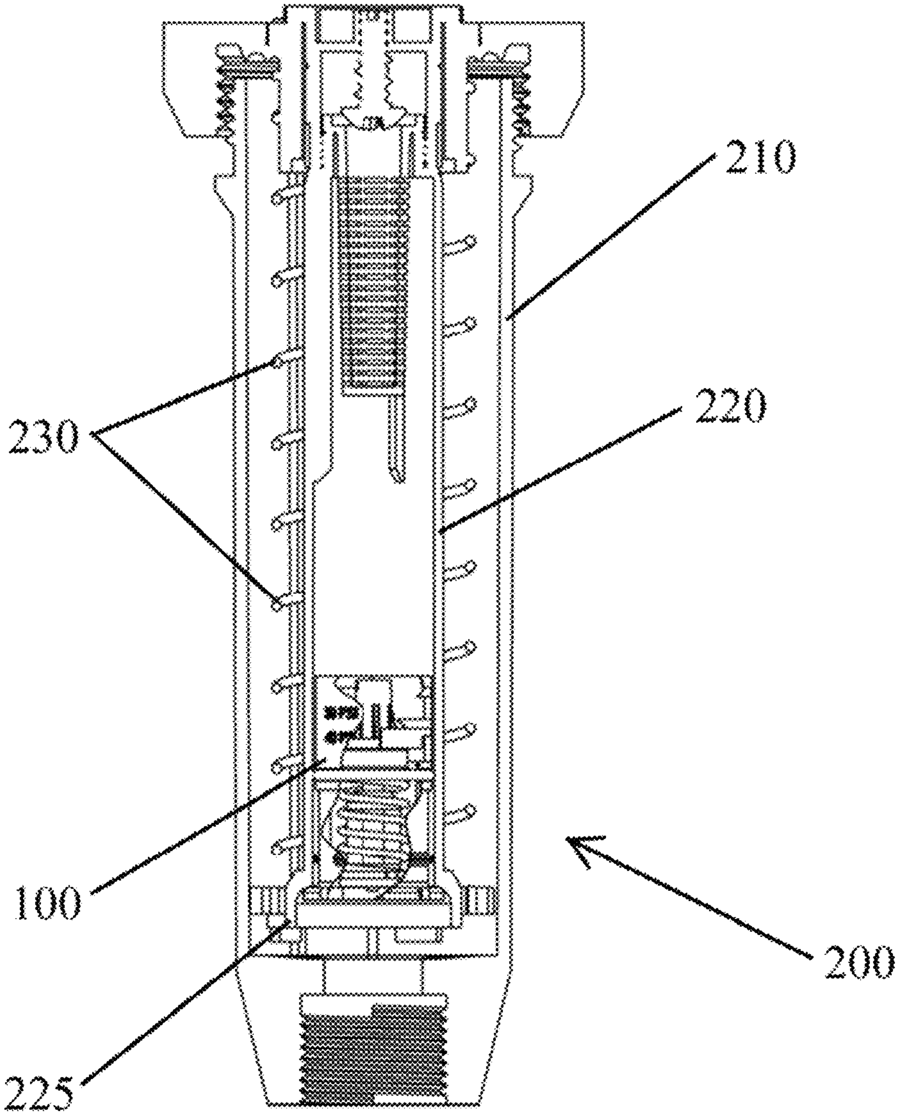
FIG. 10 shows a cross-sectional view of the pressure regulator with check valve for sprinklers of the present invention as it would be installed in a conventional pop-up sprinkler with the riser tube in the retracted position.
Figure 11:
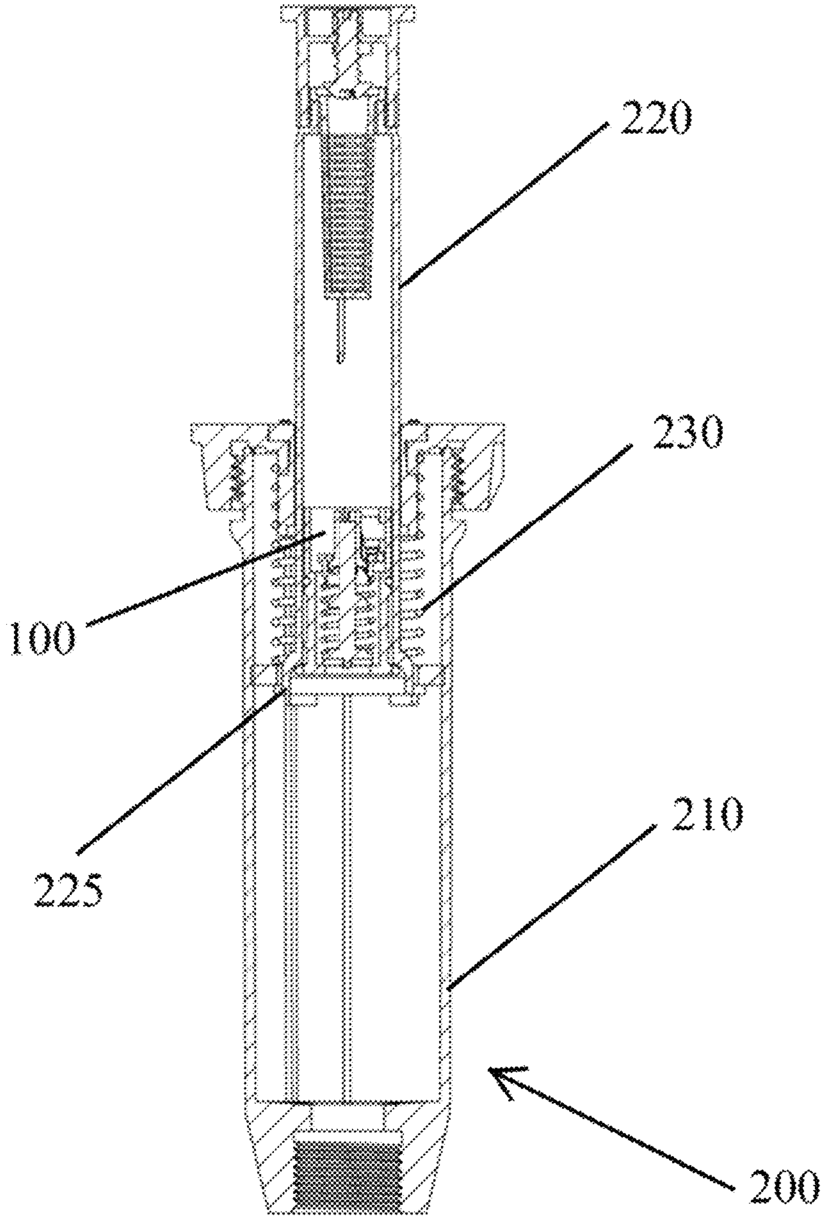
FIG. 11 shows a cross-sectional view of the pressure regulator with check valve for sprinklers of the present invention as it would be installed in a conventional pop-up sprinkler with the riser tube in the extended position.

The pressure regulator with check valve for sprinklers 100 of the present invention comprises a housing 10, a shaft assembly 20, a spring 30, and a skirt element 40. A conventional pop-up sprinkler 200 comprises a housing 210, a riser tube 220, and a spring 230 that is placed such that it presses the riser tube 220 downward in the retracted position with the top of the riser tube 220 flush with the ground. When water flows into the pop-up sprinkler 200, the water pressure causes the spring 230 to be compressed thus allowing the riser tube 220 to pop-up above the ground to its extended position. The pressure regulator with check valve for sprinklers 100 of the present invention is inserted into the lower section of the riser tube 220 of a conventional pop-up sprinkler 200 through the bottom opening 225 thereof as shown in FIGS. 10 and 11.

Figure 2:
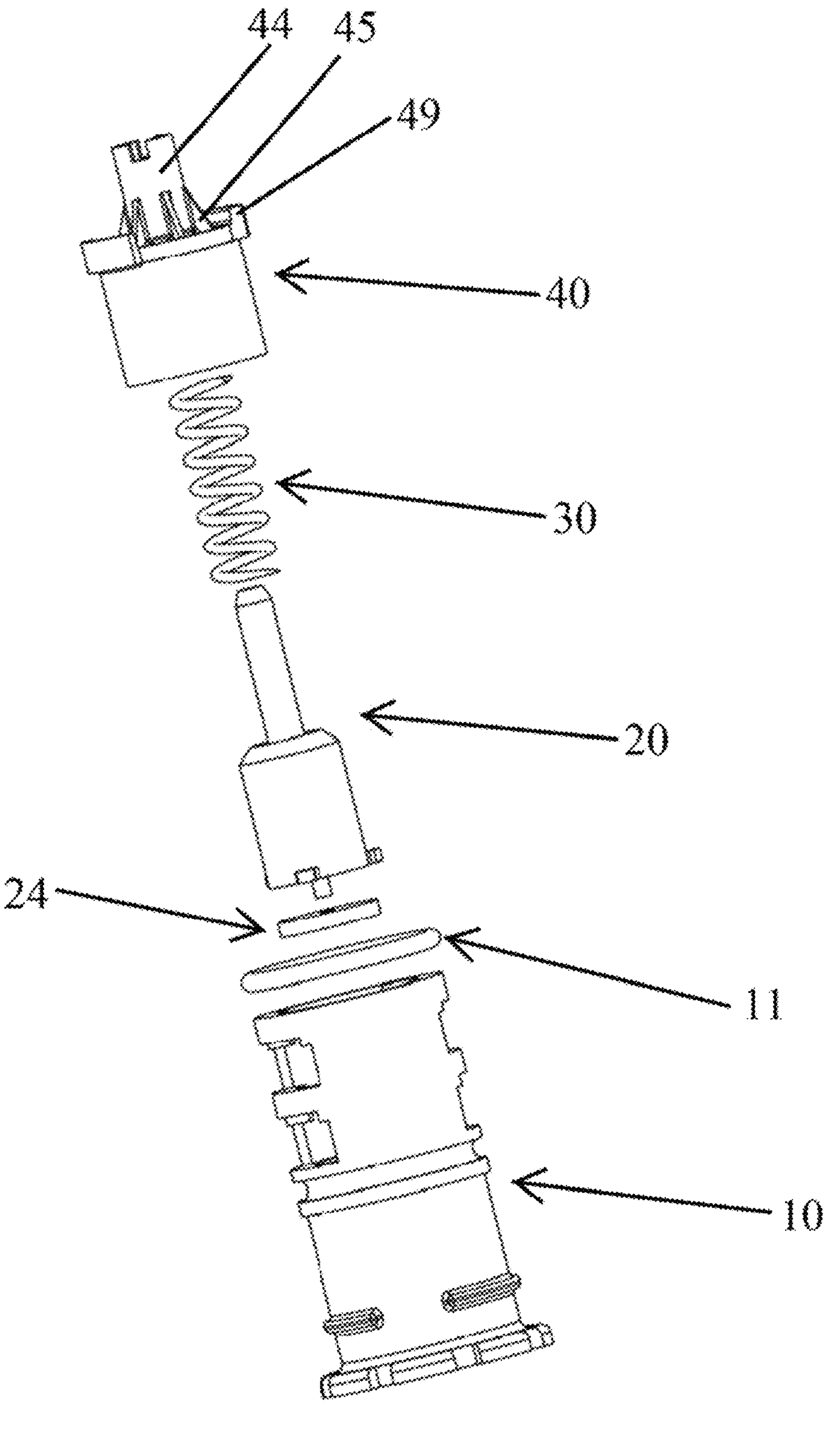
FIG. 2 shows an exploded view of the pressure regulator with check valve for sprinklers according to the present invention.
Figure 3:
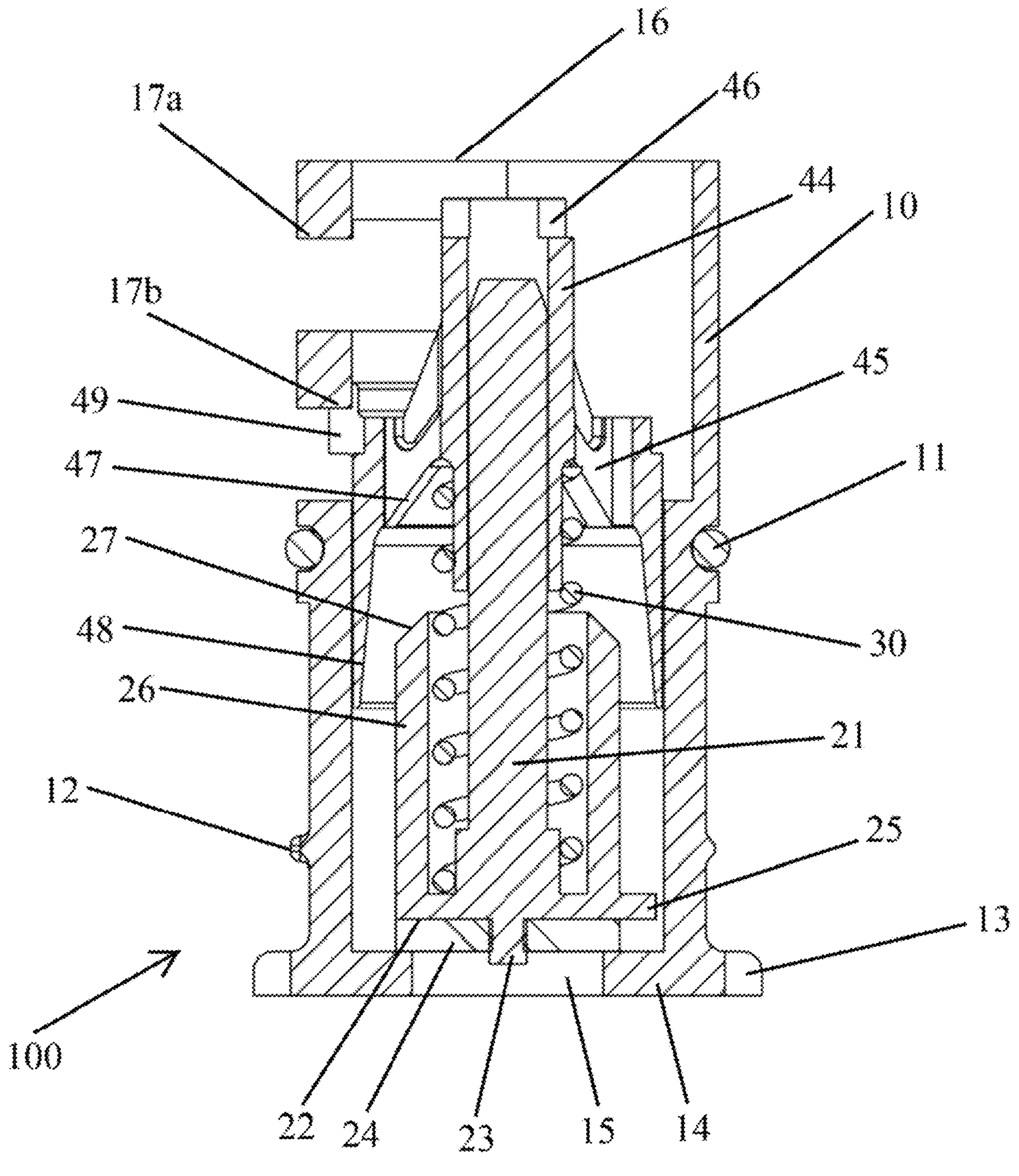
FIG. 3 shows a cross-sectional view of the pressure regulator with check valve for sprinklers according to the present invention.

FIG. 1 shows a perspective view of the pressure regulator with check valve for sprinklers 100 of the present invention. FIG. 2 shows an exploded view of the pressure regulator with check valve for sprinklers 100 of the present invention to depict in greater detail the various components that comprise the pressure regulator with check valve for sprinklers 100. FIG. 3 shows a cross-sectional view of the pressure regulator with check valve for sprinklers 100 of the present invention to depict in greater detail the interaction and assembly of the various components that comprise the pressure regulator with check valve for sprinklers 100.

Figure 4:
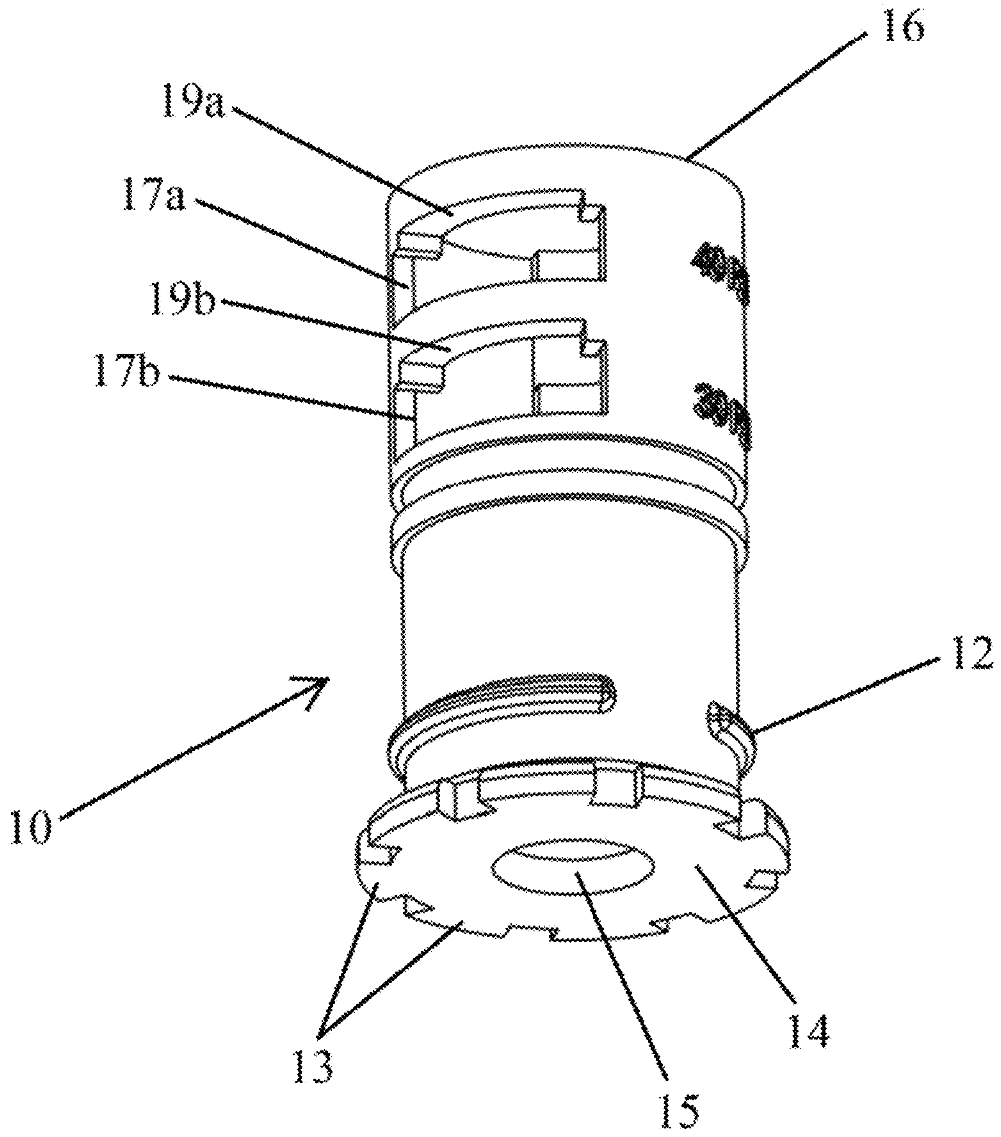
FIG. 4 shows a perspective view of the housing of the present invention.

As shown in FIG. 4, the housing 10 is primarily tubular in shape with an outer diameter that is slightly less than the inner diameter of the riser tube 220 of a conventional pop-up sprinkler 200 so that the housing 10 can be inserted into the riser tube 220 with minimal play or movement therewithin. An O-ring 11 around the middle of the housing 10 creates a radial seal between the housing 10 and the riser tube 220 to prevent water from flowing outside of the housing 10. At least one radial rib 12 located towards the lower end of the housing 10 allows the housing to be centered within the riser tube 220 and reduces any play or movement of the housing 10 within the riser tube 220. A plurality of flanges 13 extend radially outward around the bottom edge of the housing 10. The flanges 13 serve as stoppers that rest on the bottom edge 225 of the riser tube 220 to prevent the pressure regulator with check valve for sprinklers 100 of the present invention from being fully inserted or pushed into the riser tube 220. A bottom plate 14 is located at the lower end of the housing 10 with a hole 15 at the center. As water is directed into the pop-up sprinkler 200, the water would normally be directed into the riser tube 220. But, when the pressure regulator with check valve for sprinklers 100 of the present invention is installed into the riser tube 220, the water is directed through the hole 15 and into the housing 10. An opening 16 is located at the top of the housing 10 to allow the water to flow through from the hole 15 and out the opening 16. Finally, at least two slots, a first slot 17*a* and a second slot 17*b*, are located around the top section of the housing 10 with one above the other. Housing ribs 19*a* and 19*b* extend radially inward from the top of the slots 17*a* and 17*b*, respectively.

Figure 5:
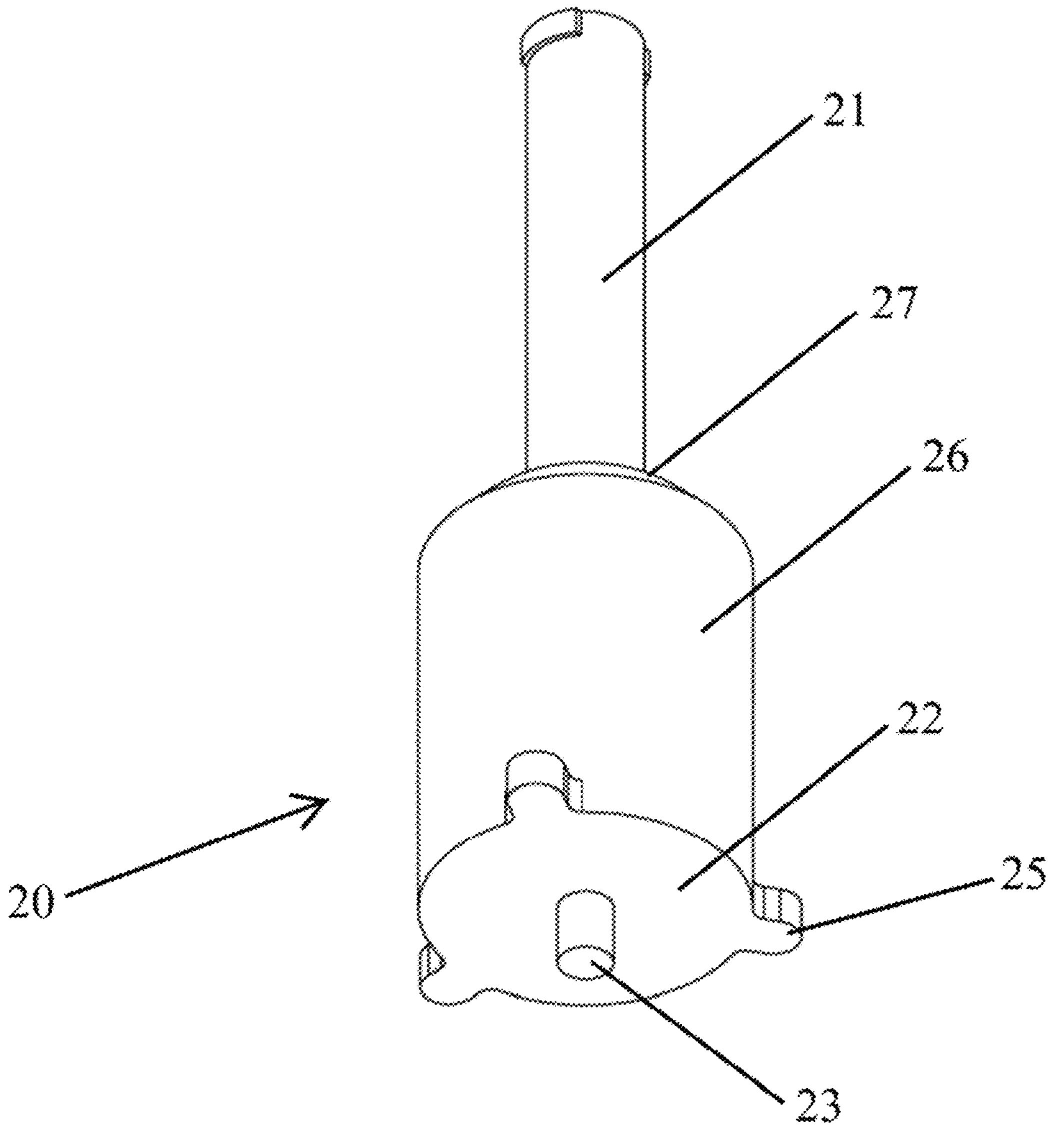
FIG. 5 shows a perspective view of the shaft assembly of the present invention.
Figure 6:
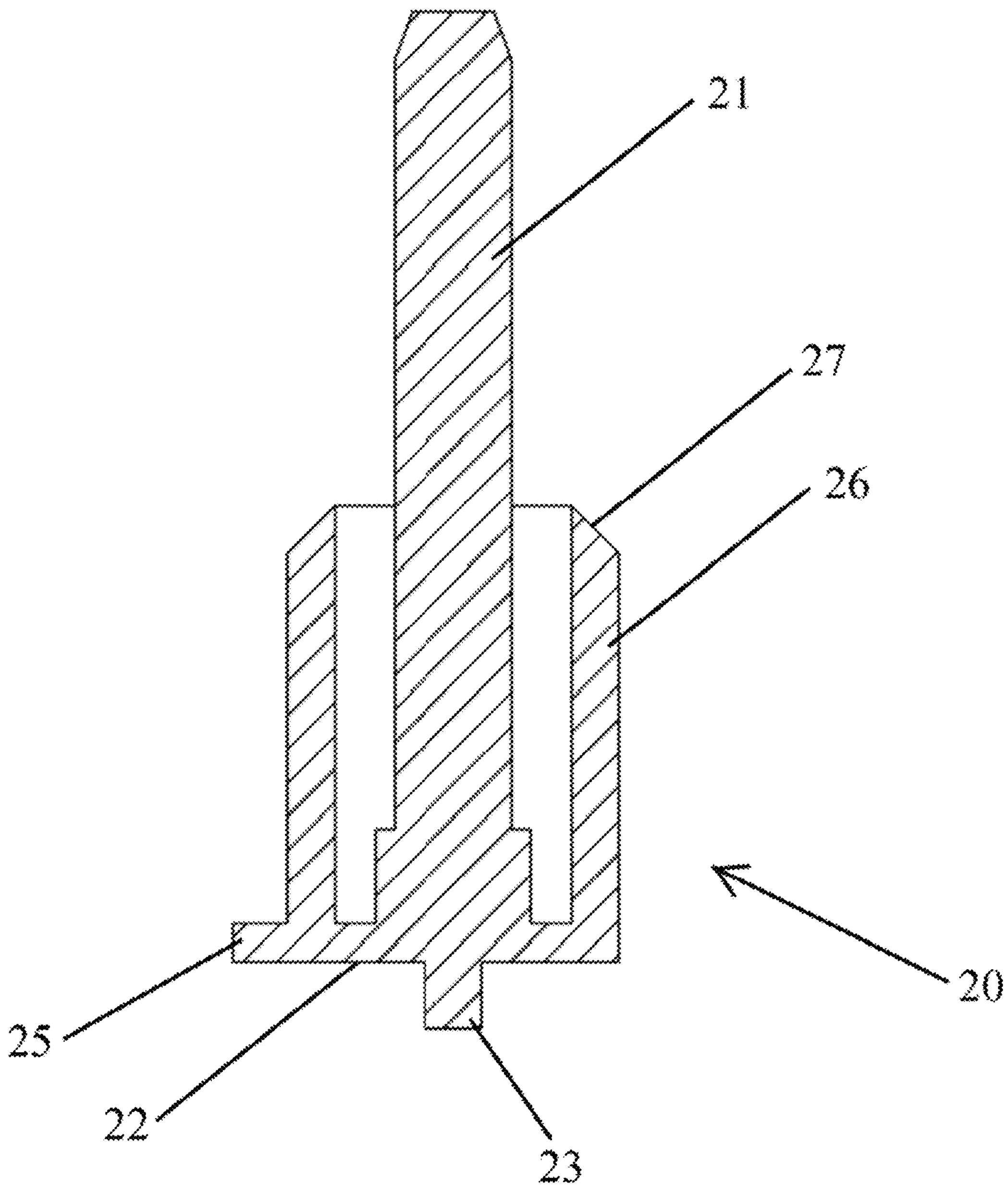
FIG. 6 shows a cross-sectional view of the shaft assembly of the present invention.

As shown in FIGS. 5 and 6, the shaft assembly 20 comprises a shaft 21 that extends longitudinally with a seal plate 22 attached to the bottom, a peg 23 extending downward from the center of the seal plate 22, and a gasket 24 placed on the bottom face of the seal plate 22 and held in place by the peg 23. A plurality of nubs 25 extend radially outward from the seal plate 22 which serve to keep the shaft assembly 20 centered within the pressure regulator with check valve for sprinklers 100 of the present invention. Finally, the shaft assembly 20 has a spring wall 26 extending upward from the seal plate 22. The spring wall 26 is primarily cylindrical, in shape but can take on any other shape. Functionally, the spring wall 26 serves to retain the spring 30 around the shaft 21. Often, as the spring 30 is compresses, it may tend to shift or displaced transversely to the shaft 21. Thus, the spring wall 26 partly encases the spring 30 so as to prevent or reduce such shift or displacement of the spring 30. The top edge of the spring wall 26 has a chamfer 27.

Figure 7:
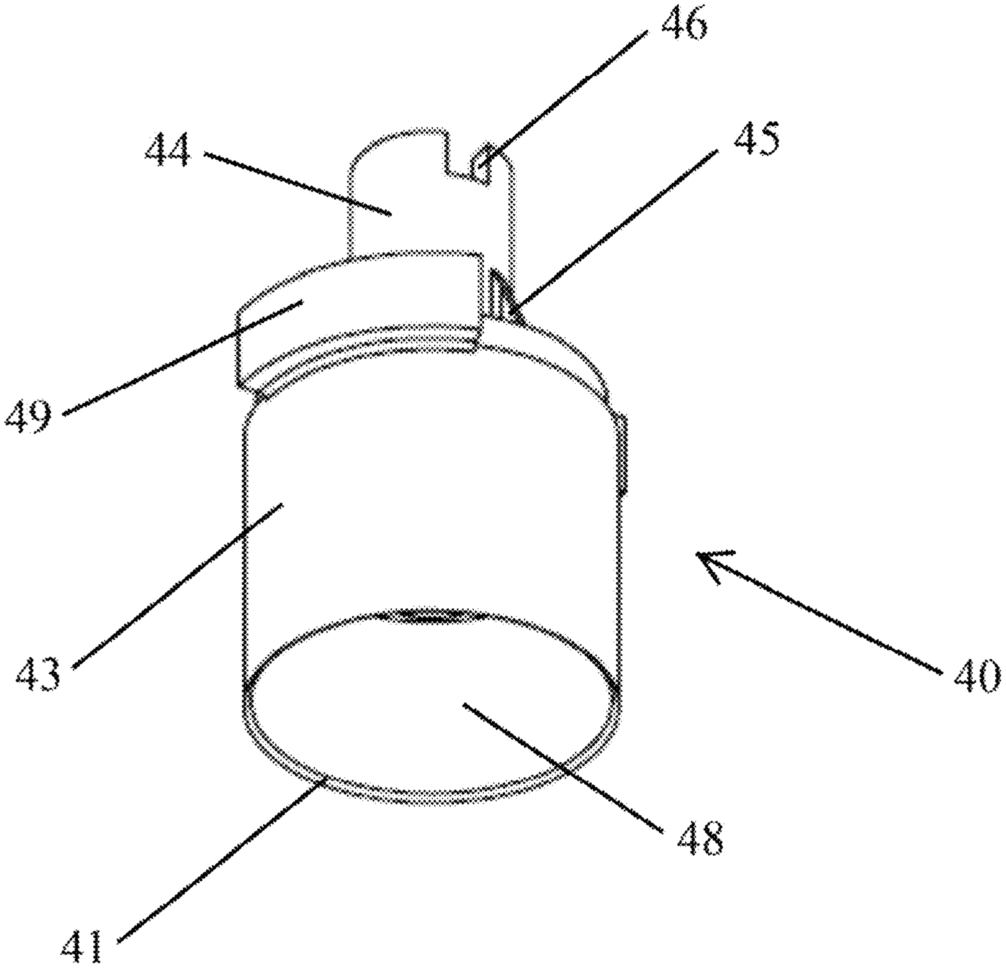
FIG. 7 shows a perspective view of the skirt element of the present invention.
Figure 8:
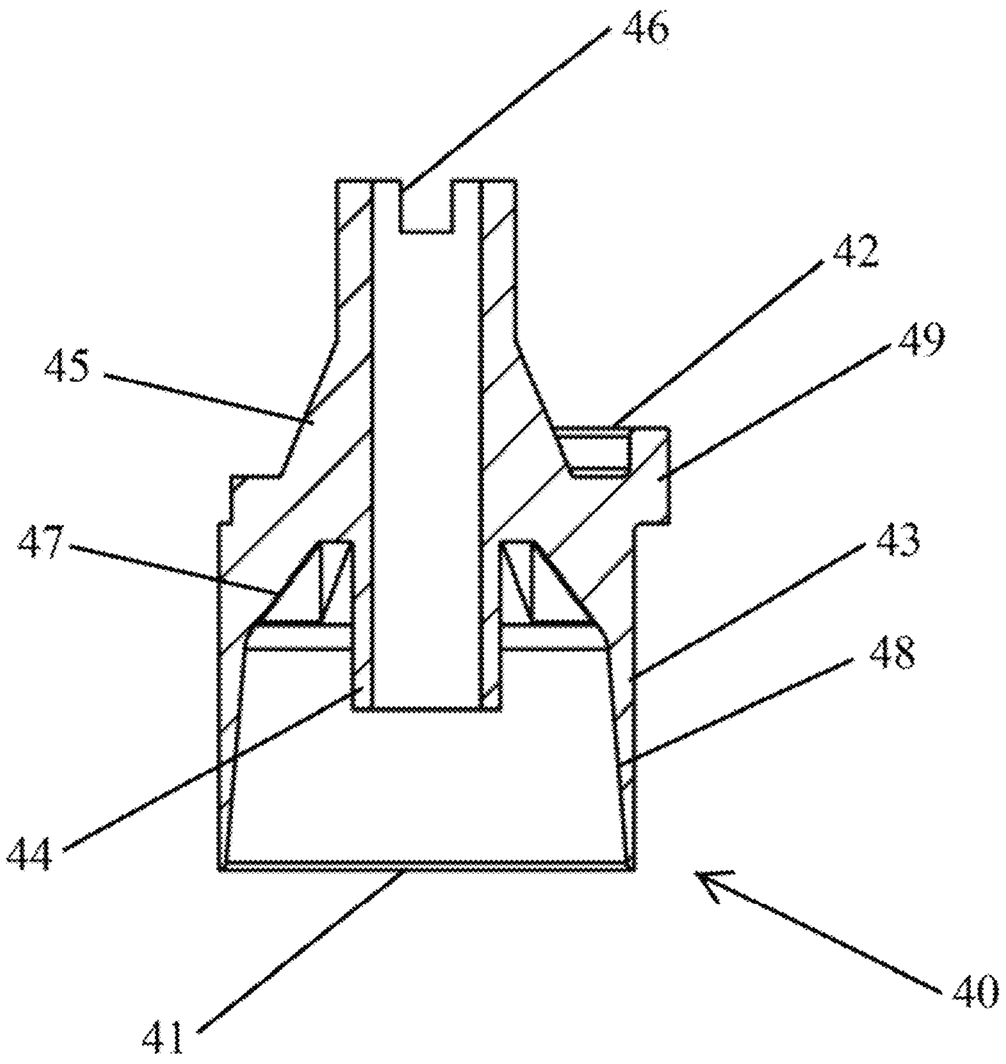
FIG. 8 shows a cross-sectional view of the skirt element of the present invention.
Figure 9:
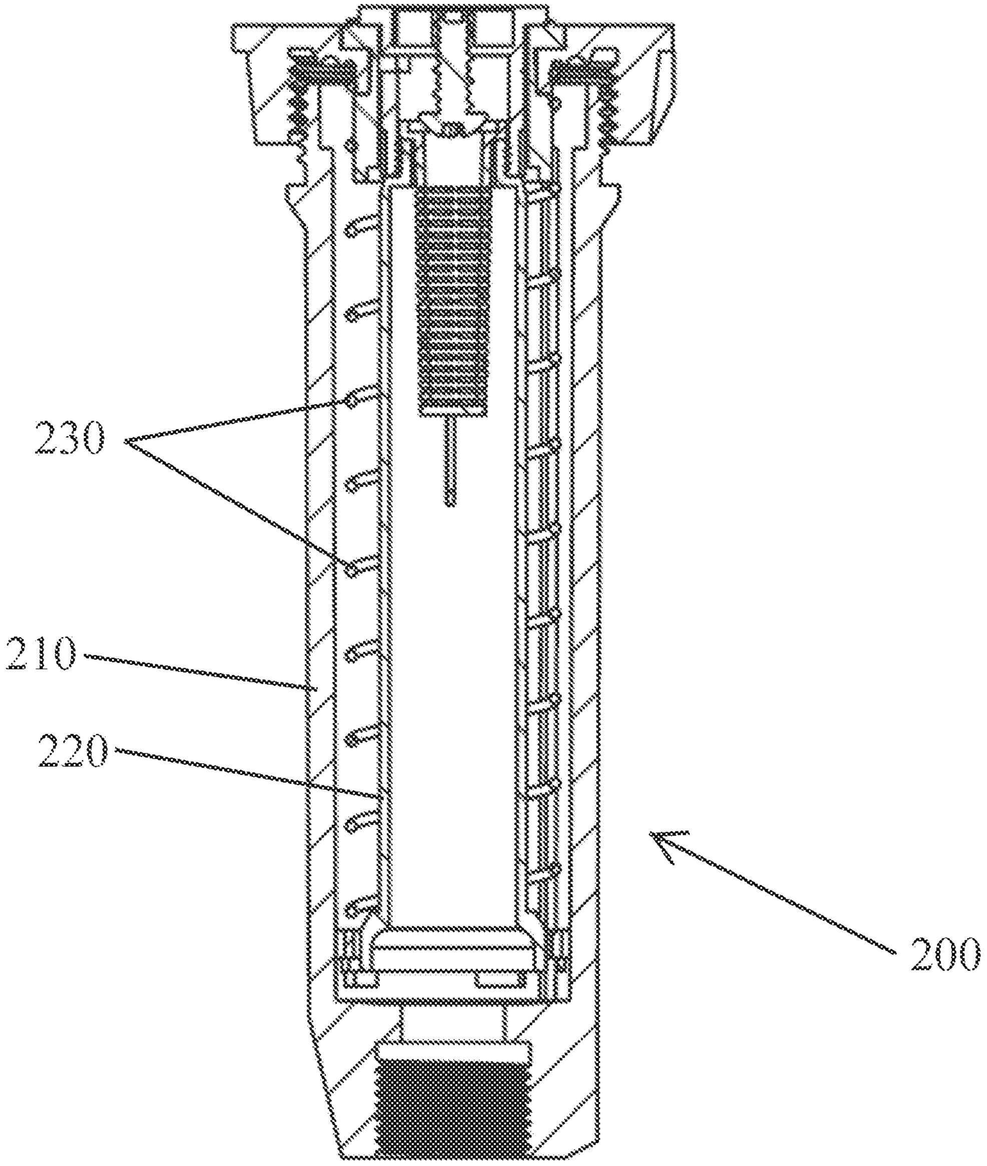
FIG. 9 Prior Art
FIG. 9 shows a cross-sectional view of a conventional pop-up sprinkler in its retracted position without the pressure regulator with check valve of the present invention.

As shown in FIGS. 7 and 8, the skirt element 40 is primarily tubular in shape with a bottom opening 41, a top opening 42, a sidewall 43, and a tube 44. The bottom section of the tube 44 is centrally located within the top section of the sidewall 43 while the top section of the tube 44 extends past the top opening 42 of the skirt element 40. The tube 44 is radially attached to the sidewall 43 by a plurality of ribs 45. The bottom of the ribs 45 have an angled edge 47 that substantially matches or mates with the chamfer 27 of the shaft assembly 20. The sidewall 43 and the tube 44 share the same center as they are concentric. A slot 46 is located at the top of the tube 44. The outer diameter of the skirt element 40 is substantially the same as the inner diameter of the housing 10 such that the skirt element 40 can be inserted into the housing 10 concentrically. However, the inner section 48 of the sidewall 43 is angled or sloped such that the inner diameter of the skirt element 40 at the bottom opening 41 is greater than the inner diameter of the skirt element 40 at the top opening 42. Finally, skirt ribs 49 extend radially outward from the top opening 42 of the skirt element 40.

Hereinafter, an explanation on the methods of assembling the product of the present invention, the installation thereof to a tree, and the operating states thereof will be given.

Assembly of the pressure regulator with check valve for sprinklers 100 of the present invention is accomplished by first placing a spring 30 around the shaft 21 with one end resting on top of the seal plate 22. Second, once the spring 30 is in place around the shaft 21, the top of the shaft 21 is inserted into the skirt element 40 through the bottom opening 41 until the top of the shaft 21 is inserted into the bottom end of the tube 44. Once in place, the shaft assembly 20 is within the skirt element 40 and the spring 30 is held in place by the seal plate 22 in one end and the radial ribs 45 in the other. Third, with the spring 30 and shaft assembly 20 in place, the bottom opening 41 of the skirt element 40 is inserted into the housing 10 through the opening 16. When inserting the skirt element 40 into the housing 10, the skirt ribs 49 must not be in alignment with the housing ribs 19*a* or 19*b*. As the skirt element 40 is inserted into the housing 10, the gasket 24 is pressed against the bottom plate 14 such that the spring 30 is compressed. Once the skirt ribs 49 are inserted past the housing ribs 19*a*, the slot 46 is used to rotate the skirt element 40 with a screwdriver. The skirt element 40 is then released when the skirt ribs 49 are aligned directly under the housing ribs 19*a*. Once released, the skirt element 40 is held within the housing 10 by the skirt ribs 49 pressing against the housing ribs 19*a* and the spring partly compressed so as to push the seal plate 22 against the bottom plate 14.

Alternatively, instead of a skirt element 40 that has to be rotated to be retained within the housing 10, the skirt ribs 49 in the skirt element 40 can be designed to flex so as to serve as a snapping mechanism. Thus, the flexing skirt ribs 49 can then snap into the slots 17*a* and 17*b* of the housing 10 so as to retain the skirt element 40 within the housing 10.

After the pressure regulator with check valve for sprinklers 100 of the present invention is assembled as described above, the housing 10 is inserted into the riser tube 220 of a pop-up sprinkler 200 through the bottom end until the flanges 13 rest on the bottom edge 225 of the riser tube 220 to prevent the pressure regulator with check valve for sprinklers 100 of the present invention from being fully inserted or pushed into the riser tube 220. Once in place, the friction between the O-ring 11 and the inner sidewall of the riser tube 220 holds the pressure regulator with check valve for sprinklers 100 of the present invention in place within the riser tube 220 of the pop-up sprinkler 200.

With the pressure regulator with check valve for sprinklers 100 of the present invention inserted into the riser tube 220 of a pop-up sprinkler 200, the irrigation water is turned on and water flowing into the pop-up sprinkler 200 is directed to the hole 15. The water pressure then pushes against the gasket 24 and the seal plate 22. As the upward pressure from the water against the seal plate 22 becomes greater than the downward pressure from the spring 30 against the seal plate 22, the seal plate 22 and the shaft assembly 20 are displaced upward to allow the water to flow upward around it until it exists through the opening 16.

As the irrigation water flows through the pressure regulator with check valve for sprinklers 100 of the present invention, the pressure of the water is regulated by the seal plate 22 and the inner section 48 of the sidewall 43 that is angled or sloped such that the inner diameter of the skirt element 40 varies between its bottom opening 41 and its top opening 42. Essentially, the irrigation water is directed into the pressure regulator with check valve for sprinklers 100 of the present invention and around the seal plate 22 through a cross-section that is defined by the outer edge or circumference of the seal plate 22 and the inner diameter of the skirt element 40. Since the inner diameter of the skirt element 40 is greater towards the bottom opening 41 and less towards the top opening 42, the cross-section through which the irrigation water flows through is greater towards the bottom opening 41 and less towards the top opening 42. Ultimately, the pressure of the irrigation water as it exits the pressure regulator with check valve for sprinklers 100 of the present invention and is ejected out of the pop-up sprinkler 200 is regulated by the size of the cross-section. Essentially, the pressure of the irrigation water ejected out of the pop-up sprinkler 200 is ultimately regulated by the distance that the seal plate 22 is displaced within the skirt element 40 from the bottom plate 14. Displacement of the seal plate 22 ceases when the chamfer 27 is pressed against the an angled edge 47 at the bottom of the ribs 45.

When assembling the skirt element 40 into the housing 10, the skirt ribs 49 can aligned with the housing ribs 19*a* of the first slot 17*a* or the housing ribs 19*b* of the second slot 17*b*. Aligning the skirt ribs 49 with housing ribs 19*a* allows the seal plate 22 to be displaced upwardly a greater distance from the bottom plate 14 than aligning the skirt ribs 49 with the housing ribs 19*b* because the first slot 17*a* is higher than the second slot 17*b*. Essentially, aligning the skirt element 40 with the first slot 17*a* regulates the irrigation water to flow out of the pop-up sprinkler 200 at a first predetermined water pressure. Similarly, aligning the skirt element 40 with the second slot 17*b* regulates the irrigation water to flow out of the pop-up sprinkler 200 at a second predetermined water pressure. In addition, to further regulate or set the water pressure, a spring 30 with s specific strength or resistance can be used to correspond to the desired water pressure.

Figure 12:
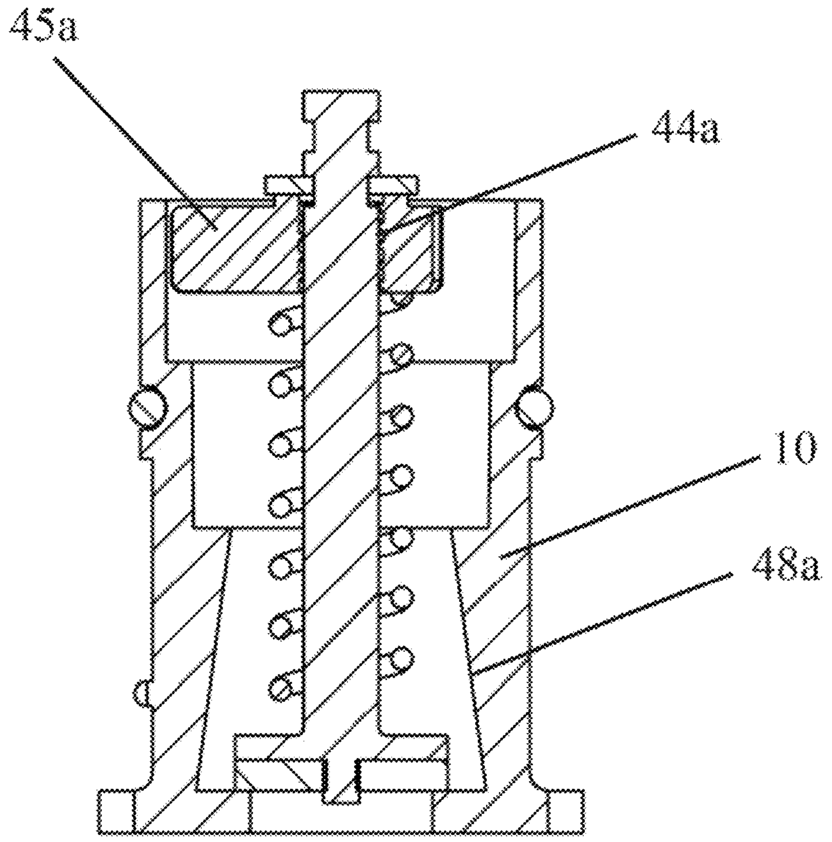
FIG. 12 shows a cross-sectional view of the alternative embodiment of the pressure regulator with check valve for sprinklers of the present invention without a skirt element.

An alternative embodiment of the pressure regulator with check valve for sprinklers 100 of the present invention eliminates the need of the skirt element 40 and includes the integral characteristics of the skirt element 40 within the housing 10 and shaft assembly 20, as shown in FIG. 12. Essentially, the sloping inner section 48*a* is incorporated into the sidewall of the housing 10. In addition, the tube 44*a* is incorporated in the housing 10. The tube 44*a* is concentrically attached within the housing 10 by a plurality of ribs 45*a*.

It is understood that the described embodiments of the present invention are illustrative only, and that modifications thereof may occur to those skilled in the art. Accordingly, this invention is not to be regarded as limited to the embodiments disclosed, but to be limited only as defined by the appended claims herein.

What is claimed is:

1. A water pressure regulator comprising:
- a spring;
- a housing having a bottom plate with a hole, an opening, and a slot having a housing rib;
- a shaft assembly having a shaft and a seal plate;
- a skirt element having a bottom opening, a top opening, a sidewall, a skirt rib, and a tube;
- wherein said shaft is inserted through said spring and through said tube of said skirt element that is inserted into said housing such that said seal plate rests against said bottom plate; and
- wherein said skirt element is retained within said housing by said skirt rib and said housing rib.

2. The water pressure regulator of claim 1 wherein said sidewall of said skirt element comprises an inner diameter formed by an inner section that is sloped such that said inner diameter is greater at said bottom opening and less at said top opening.

3. The water pressure regulator of claim 1 further comprising a slot located at the top of said tube of said skirt element.

4. The water pressure regulator of claim 1 wherein said shaft assembly further comprises a spring wall.

5. The water pressure regulator of claim 1 wherein said housing and said skirt element are both tubular in shape and said tube is concentrically attached within said skirt element by a plurality of ribs.

6. The water pressure regulator of claim 5 wherein said plurality of ribs have an angled edge that is angled to match with a chamfer on the top edge of a spring wall in said shaft assembly.

7. The water pressure regulator of claim 1 further comprising a gasket placed on a bottom face of said seal plate.

8. The water pressure regulator of claim 1 further comprising a plurality of nubs extending radially outward from said seal plate.

9. The water pressure regulator of claim 1 further comprising a spring wall extending upward from said seal plate.

10. The water pressure regulator of claim 1 further comprising a plurality of flanges extending outward from a bottom edge of said housing.

11. The water pressure regulator of claim 1 further comprising a second slot below said slot and having a second housing rib wherein said skirt element is retained within said housing by said skirt rib and said second housing rib.

12. The water pressure regulator of claim 1 further comprising an o-ring around said housing.

13. The water pressure regulator of claim 1 wherein said housing is inserted into a riser tube of a pop-up sprinkler with said bottom plate facing downward.

14. The water pressure regulator of claim 13 further comprising an o-ring around said housing that creates a radial seal with said riser tube and further comprising a rib around said housing that keeps said housing concentric within said riser tube.

15. A water pressure regulator comprising:
- a spring;
- a housing having a bottom plate with a hole, an opening, and a slot;
- a shaft assembly having a shaft and a seal plate;
- a skirt element having a bottom opening, a top opening, a sidewall, a skirt rib, and a tube;
- wherein said shaft is inserted through said spring and through said tube of said skirt element that is held within said housing such that said seal plate rests against said bottom plate; and
- wherein said skirt element is retained within said housing by said skirt rib inserted into said slot.

16. The water pressure regulator of claim 15 wherein said sidewall of said skirt element comprises an inner diameter formed by an inner section that is sloped such that said inner diameter is greater at said bottom opening and less at said top opening.

17. The water pressure regulator of claim 15 further comprising a slot located at the top of said tube of said skirt element.

18. The water pressure regulator of claim 15 wherein said shaft assembly further comprises a spring wall.

19. The water pressure regulator of claim 15 wherein said housing and said skirt element are both tubular in shape and said tube is concentrically attached within said skirt element by a plurality of ribs.

20. The water pressure regulator of claim 19 wherein said plurality of ribs have an angled edge that is angled to match with a chamfer on the top edge of a spring wall in said shaft assembly.

21. The water pressure regulator of claim 15 further comprising a gasket placed on a bottom face of said seal plate.

22. The water pressure regulator of claim 15 further comprising a plurality of nubs extending radially outward from said seal plate.

23. The water pressure regulator of claim 15 further comprising a spring wall extending upward from said seal plate.

24. The water pressure regulator of claim 15 further comprising a plurality of flanges extending outward from a bottom edge of said housing.

25. The water pressure regulator of claim 15 further comprising a second slot below said slot and having a housing rib wherein said skirt element is retained within said housing by said skirt rib and said housing rib.

26. The water pressure regulator of claim 15 further comprising an o-ring around said housing.

27. The water pressure regulator of claim 15 wherein said housing is inserted into a riser tube of a pop-up sprinkler with said bottom plate facing downward.

28. The water pressure regulator of claim 27 further comprising an o-ring around said housing that creates a radial seal with said riser tube and further comprising a rib around said housing that keeps said housing concentric within said riser tube.

* * * * *